(12) United States Patent
Daub

(10) Patent No.: US 9,821,382 B2
(45) Date of Patent: Nov. 21, 2017

(54) INDEXABLE INSERT FOR SHOULDER MILLING CUTTER AND SHOULDER MILLING CUTTER WITH MOUNTING CUTOUTS FOR INDEXABLE INSERTS

(71) Applicant: Walter AG, Tübingen (DE)

(72) Inventor: Jürgen Daub, Rottenburg (DE)

(73) Assignee: Walter AG, Tübingen (DE)

( * ) Notice: Subject to any disclaimer, the term of this patent is extended or adjusted under 35 U.S.C. 154(b) by 240 days.

(21) Appl. No.: 14/397,528

(22) PCT Filed: Apr. 26, 2013

(86) PCT No.: PCT/EP2013/058753
§ 371 (c)(1),
(2) Date: Oct. 28, 2014

(87) PCT Pub. No.: WO2013/167400
PCT Pub. Date: Nov. 14, 2013

(65) Prior Publication Data
US 2015/0117970 A1    Apr. 30, 2015

(30) Foreign Application Priority Data
May 9, 2012   (DE) .................. 10 2012 104 082

(51) Int. Cl.
*B23C 5/20* (2006.01)
*B23C 5/22* (2006.01)
*B23C 5/06* (2006.01)

(52) U.S. Cl.
CPC ............ *B23C 5/06* (2013.01); *B23C 5/207* (2013.01); *B23C 5/202* (2013.01);
(Continued)

(58) Field of Classification Search
CPC . B23C 5/207; B23C 5/202; B23C 2200/0433; Y10T 407/23
See application file for complete search history.

(56) References Cited

U.S. PATENT DOCUMENTS 3,289,271 A   12/1966  Stier
4,074,949 A   2/1978   Hochmuth et al.
(Continued)

FOREIGN PATENT DOCUMENTS

CN   101274375   10/2008
CN   201572952   9/2010
(Continued)

OTHER PUBLICATIONS

International Search Report and Written Opinion from PCT/EP2013/058753 dated Jul. 25, 2013.
(Continued)

*Primary Examiner* — Sunil K Singh
*Assistant Examiner* — Ryan Rufo
(74) *Attorney, Agent, or Firm* — Morgan, Lewis & Bockius LLP

(57) ABSTRACT

Indexable insert has a non-rectangular parallelogram shape with nearly rhombic basic shape and an imaginary intermediate plane spanned by four corners of an imaginary rhombus with sides running at a distance away from the upper side and the underside along the peripheral lateral surface in a plane such that each equivalent cutting edge has the same variation of distance and angle from the intermediate plane. Two diagonally opposing corners of both the upper side and the underside each have a greater distance from the intermediate plane than do the respective diagonally opposing corners of the upper side and the underside lying therebetween, and the diagonally opposing corners of the upper side and of the underside are shifted parallel to the intermediate plane and, as viewed in a plan view onto the intermediate plane, in mutually opposite directions away from the associated diagonals of the rhombus spanning the intermediate plane.

17 Claims, 4 Drawing Sheets

Figure 1:
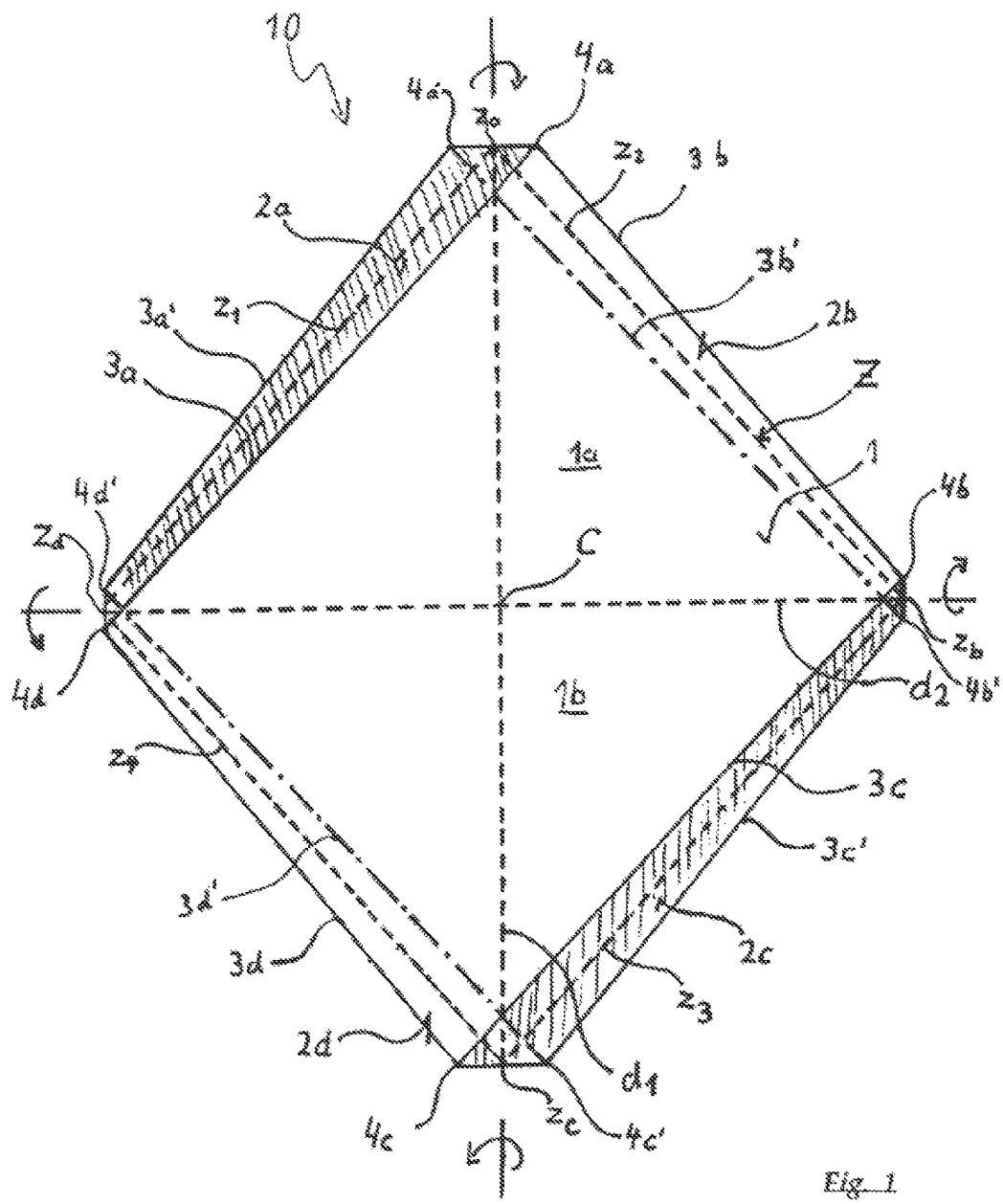

(52) U.S. Cl.
CPC  *B23C 2200/0433* (2013.01); *B23C 2200/085* (2013.01); *B23C 2200/086* (2013.01); *B23C 2200/125* (2013.01); *B23C 2200/128* (2013.01); *B23C 2200/164* (2013.01); *B23C 2200/165* (2013.01); *B23C 2210/045* (2013.01); *B23C 2210/0457* (2013.01); *B23C 2210/168* (2013.01); *Y10T 407/1924* (2015.01); *Y10T 407/235* (2015.01)

(56) References Cited

U.S. PATENT DOCUMENTS

| | | | | |
|---|---|---|---|---|
| 5,071,291 | A * | 12/1991 | Kaminski | B23C 3/06 407/113 |
| 5,193,946 | A * | 3/1993 | Arai | B23B 27/007 407/113 |
| 5,383,750 | A * | 1/1995 | Satran | B23C 5/1072 407/113 |
| 6,142,746 | A * | 11/2000 | Lundgren | F04F 7/02 417/226 |
| 6,540,447 | B2 * | 4/2003 | Nagata | B23C 5/2221 407/114 |
| 6,851,897 | B2 * | 2/2005 | Kubo | B23C 5/2221 407/114 |
| 7,819,610 | B2 | 10/2010 | Wallström et al. | |
| 2003/0152430 | A1 * | 8/2003 | Mina | B23C 5/109 407/113 |
| 2004/0071515 | A1 * | 4/2004 | Arvidsson | B23C 5/109 407/113 |
| 2004/0208713 | A1 | 10/2004 | Duerr et al. | |
| 2005/0169716 | A1 | 8/2005 | Smilovici et al. | |
| 2006/0045636 | A1 | 3/2006 | Johnson et al. | |
| 2007/0104546 | A1 | 5/2007 | Maeta et al. | |
| 2008/0170919 | A1 * | 7/2008 | Dufour | B23C 5/06 407/116 |
| 2008/0267722 | A1 | 10/2008 | Jacob | |
| 2009/0047078 | A1 | 2/2009 | Kirchberger | |
| 2011/0097164 | A1 * | 4/2011 | Choi | B23C 5/08 407/46 |
| 2013/0051936 | A1 | 2/2013 | Satran et al. | |
| 2013/0129430 | A1 | 5/2013 | Bhagath et al. | |

FOREIGN PATENT DOCUMENTS

| | | | |
|---|---|---|---|
| DE | 1 502 030 A1 | 5/1969 | |
| DE | 9320349 | 8/1994 | |
| DE | 103 12 922 A1 | 10/2004 | |
| DE | 603 11 001 T2 | 7/2007 | |
| EP | 0 571 932 | 5/1993 | |
| EP | 0 925 863 A2 | 6/1999 | |
| EP | 1 952 925 A2 | 8/2008 | |
| EP | 1 985 394 A2 | 10/2008 | |
| EP | 2450138 A1 * | 5/2012 | B23C 5/207 |
| EP | 2559509 A1 * | 2/2013 | B23C 5/207 |
| JP | 06210510 A * | 8/1994 | B23C 5/10 |
| JP | 2005-028536 A * | 2/2005 | B23C 5/20 |
| JP | 2011-206898 A * | 10/2011 | B23C 5/20 |
| WO | 03/101655 A1 | 12/2003 | |
| WO | 2004/048021 A1 | 6/2004 | |
| WO | 2004/050283 A1 | 6/2004 | |
| WO | 2007/101281 A1 | 9/2007 | |
| WO | 2011/122676 A1 | 10/2011 | |
| WO | WO 2011121787 A1 * | 10/2011 | B23C 5/202 |
| WO | 2012/043579 A1 | 4/2012 | |

OTHER PUBLICATIONS

German Search Report in DE 10 2012 104 082.6 dated Dec. 10, 2012.
International Preliminary Report on Patentability dated Nov. 11, 2014, for International Application No. PCT/EP2013/058753.
English translation of Notification of First Office Action for Chinese Application No. 2013-80023049.2, dated Nov. 24, 2015.
Office Action dated Dec. 6, 2016, issued in corresponding Japanese Patent Application No. 2015-510720.

* cited by examiner

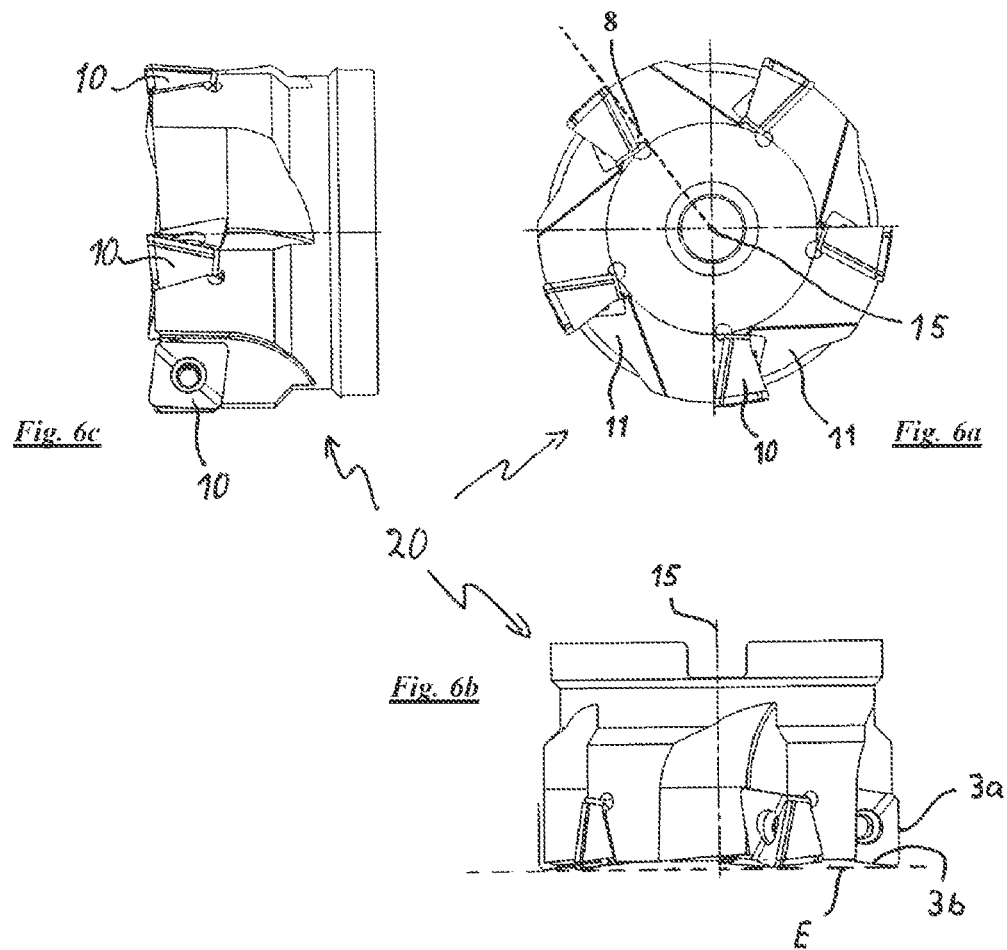
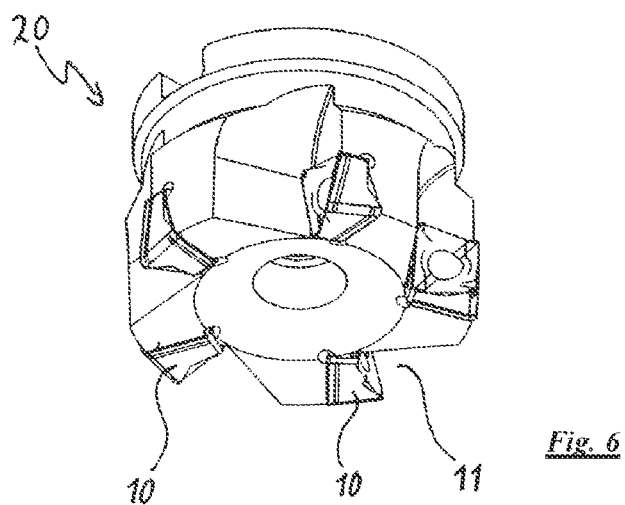

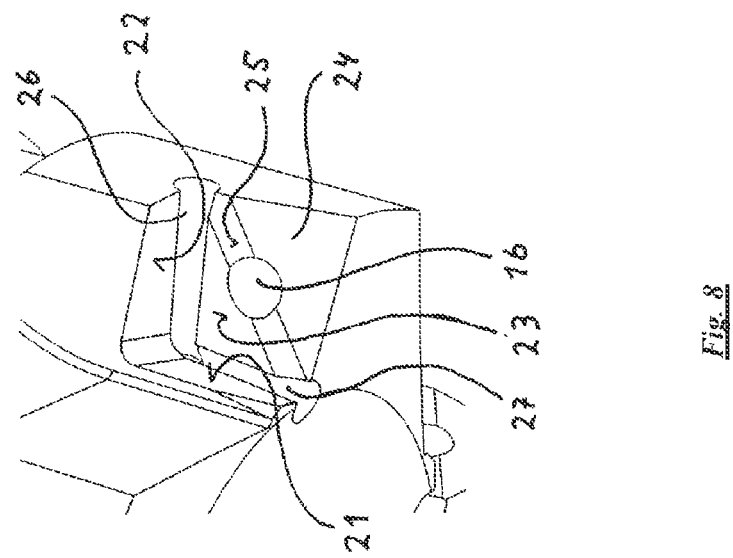
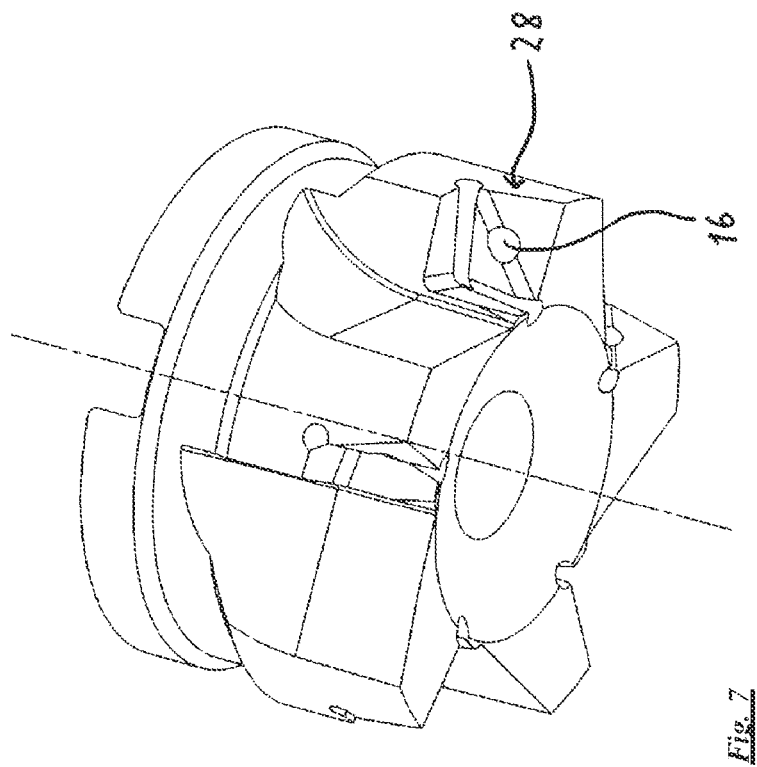

INDEXABLE INSERT FOR SHOULDER MILLING CUTTER AND SHOULDER MILLING CUTTER WITH MOUNTING CUTOUTS FOR INDEXABLE INSERTS

RELATED APPLICATIONS

The present application is a U.S. National Phase Application of International Application No. PCT/EP2013/058753, filed 26 Apr. 2013, which claims priority to German Application No. 10 2012 104 082.6, filed 9 May 2012.

The present invention concerns an indexable insert having a top side and an underside which are connected together by a peripherally extending side surface comprising a plurality of surface portions, wherein at least some of the intersection lines between the surface portions and the top side and the underside respectively relative to each other form equivalent cutting edges and the indexable insert in a plan view on to the top side and the underside is respectively in the shape of a non-rectangular parallelogram with an almost rhombic basic shape and has a notional intermediate plane which is spanned by a rhombus, whose sides extend at a spacing relative to the top side and the underside along the peripherally extending side surface in a plane in such a way that each of the equivalent cutting edges of the top side and the underside has the same variation in spacing and angle relative to the intermediate plane spanned by the notional rhombus.

The present invention also concerns a shoulder milling cutter having a plurality of mounting cutouts for indexable inserts which respectively have at least 3 seat surfaces of which a first seat surface provides a support for an indexable insert predominantly in a radial direction, a second seat surface provides a support predominantly in an axial direction and a third seat surface provides a support for the indexable insert predominantly in the tangential direction.

An indexable insert having a basic shape which is rhombic in plan view and in which diagonally opposite corners are respectively at the same spacing relative to a notional intermediate plane, wherein the corners respectively have in paired relationship a smaller and a larger spacing relative to said intermediate plane, is known from DE 103 12 922 A1.

A further indexable insert on to which the features of the classifying portion of claim 1 can be read is known from U.S. Pat. No. 4,074,949. That indexable insert is produced by diagonally grinding a groove into the side surfaces of a parallelepipedic plate. Starting from an intermediate plane spanned by a square or rectangle it would also be possible to represent such a plate in such a way that the top side is stretched along one diagonal and is compressed along the other diagonal and that similarly the underside is stretched and compressed along the respective other diagonals.

The top side and the underside of that known indexable insert are parallel to each other and the indexable insert is substantially intended for a tangential advance feed, that is to say the rhombic main surfaces are not rake surfaces but relief surfaces while the peripherally extending side surfaces are at least partially rake surfaces.

In the case of DE 103 12 922 the production of suitable contact surfaces on the indexable inserts and a corresponding tool like for example a shoulder milling cutter is relatively difficult as the diagonal rising and lowering of the corners results in helically twisted top and undersides so that it is difficult to support corresponding indexable inserts over a large surface area in relation to the respectively active cutting edge, even if central flat recesses are provided. In addition the shape which is rectangular in plan and the symmetrical configuration of the front and rear sides has the result that it is difficult, when using a shoulder milling cutter, to set both axially and also radially an adequate clearance angle, which leads to a limitation in respect of the maximum possible feed or by way of the diagonal distortion of the surface requires a greatly contracted rake surface, which in turn weakens the cutting edges if there should be a wish to retain a positive radial (and also a positive axial) rake angle. Adjustment of the clearance angle and the rake angle is only possible within relatively small ranges and the attainable clearance angle and positive rake angle are relatively small.

In comparison with that state of the art the object of the present invention is to provide an indexable insert which provides four equivalent stable main cutting edges, affords an adequate clearance angle for the front secondary cutting edge and has a wedge angle of less than 90° at the main cutting edge.

That object is attained by an indexable insert having the features of claim 1. According to the present invention two mutually diagonally opposite corners of the top side and two diagonally opposite corners of the underside are respectively at a greater spacing from the intermediate plane than the respectively interposed mutually diagonally opposite corners of the top side and the underside and that the mutually diagonally opposite corners of the top side as well as the mutually diagonally opposite corners of the underside are displaced in parallel relationship with the intermediate plane respectively in mutually opposite directions away from the associated diagonal of the rhombus spanning the intermediate plane.

The geometry of the indexable insert according to the invention can best be represented in the following terms. Starting from a plate of uniform thickness, which is rhombic in plan view, firstly the thickness of the plate is increased at two diagonally opposite corners, more specifically uniformly towards the top side and the underside. The top side and the underside then respectively comprise two mutually inclined triangular surfaces.

In addition then the diagonally opposite corners of that plate which is initially still rhombic in plan view are displaced in opposite directions with respect to the diagonal of the rhombus and respectively adjacent corners of the rhombus are also displaced in opposite directions with respect to their associated diagonal. As a result a non-rectangular parallelogram is formed from the rhombic basic shape of the top side and the underside, in the plan view. The corners of the top side and the underside, that belong to the same corner of the rhombic basic shape, are in turn respectively displaced in the opposite direction with respect to the diagonal of the rhombus. The lateral displacement of the corners of the top side and the underside in parallel relationship with the intermediate plane and relative to the corner of the rhombus which defines the intermediate plane is preferably at about 5% to 15% of the thickness of the indexable insert in the region of the corresponding corner.

In that way, in plan view, longer and shorter edges are afforded at the intersection lines between the side surface and the top side and the underside respectively, wherein preferably the longer sides define main cutting edges and the shorter sides are secondary cutting edges, that is to say in use on a shoulder milling cutter, the main cutting edges are oriented parallel to the axis of the milling cutter while the secondary cutting edges extend inclinedly slightly rearwardly at a clearance angle relative to a plane in perpendicular relationship with the axis of the milling cutter. At least the four main cutting edges are respectively of the same configuration and are interchangeable by rotating and turning the indexable insert and such edges which are of the same configuration and which are interchangeable are referred to in accordance with the present invention as 'equivalent' edges or cutting edges. That also includes the cutting corners at the transition to an associated secondary cutting edge.

In this context the term 'plan view' always denotes a view perpendicularly on to the notional intermediate plane.

At the same time the main and secondary cutting edges and in particular also the cutting corner at the transition from the main to the secondary cutting edge have a wedge angle of less than 90° and can thus be so oriented that, when used on a shoulder milling cutter, the arrangement involves a positive cutting geometry both in the peripheral direction and also axially. It will be appreciated that the secondary cutting edges do not have to be identical and may also not have a positive cutting geometry if they cannot come into engagement with the workpiece by virtue of a correspondingly large clearance angle. That applies in particular in terms of use on shoulder milling cutters if the acute angle of the parallelogram formed by the top side and the underside in plan view is markedly less than 90°, that is to say for example is less than 88°, in which case the angle actually included between the main and the secondary cutting edges is also markedly smaller as the top side delimited by the cutting edges is inclined relative to the intermediate plane and the plan view on to the top side corresponds to a projection of the cutting edges on to the intermediate plane.

In addition even with an axis-parallel orientation of the main cutting edge on a shoulder milling cutter there is always an adequate clearance angle in respect of the secondary cutting edge which includes an angle of less than 90° with the main cutting edge (by virtue of the acute-angled configuration of the parallelogram defining the corners of the indexable insert as a plan view), independently of the clearance angle at the main cutting edge.

In addition the triangular surface portions, as viewed in plan, of the top side and the underside are in the form of flat surfaces and thus provide a simple, relatively large and secure contact surface on a seat of a shoulder milling cutter or the like when the indexable insert is so fitted that a cutting edge on the respectively opposite side is active.

In that case the total of eight intersection lines of the four peripherally extending surface portions with the top side and the underside respectively form eight edges of which, in an embodiment, the four longer edges form main cutting edges and the four remaining edges could be secondary cutting edges. Those edges are so arranged that a main cutting edge of the top side is respectively opposite a secondary cutting edge of the underside, and vice-versa.

The preferably flat triangular surface portions of the top side and the underside form large-area contact surfaces at a corresponding seat of a milling cutter and afford good support for a main cutting edge arranged on the opposite side. Further contact surfaces are formed by at least two of the surface portions of the peripherally extending side surface respectively.

The rhombus which defines the intermediate plane and which is defined by the peripherally extending side surfaces is generally not right-angled and preferably has at its acute-angled corners an angle of between 60 and 88°. In an embodiment, in a plan view on to the top side and the underside respectively, two diagonally opposite corners are displaced in the clockwise direction with respect to the associated diagonal of the rhombus and the corners therebetween are displaced in the anti-clockwise direction in relation to their associated diagonal, thereby giving the described parallelogram shape.

The cutting corners of the indexable insert, which are arranged at the acute-angled corners of the parallelogram defined by the top side and the underside, are each at the greater spacing relative to the intermediate plane. In that case the (minimum) thickness of the insert between the top side and the underside in the region of the obtuse-angled corners is between 40% and 70% and preferably approximately half the (maximum) thickness of the indexable insert at the acute-angled corners of the parallelogram.

As already mentioned the top side and the underside are respectively formed by two substantially triangular surfaces, of which a tip respectively coincides with the acute-angled corner of the parallelogram-shaped top side and underside respectively, wherein the sides of the triangular surfaces, that are opposite to said tip, extend parallel and extend approximately between the obtuse-angled corners and wherein those triangular surfaces include an angle of between about 110° and 165°, preferably between 135° and 155°.

That angle of inclination of the surface portions of the top side and the underside effectively leads to a wedge angle measured perpendicularly to the cutting edges, at the transition to the side surfaces, that is less than 90°.

Along their parallel sides the two triangular surface portions of the top side and the underside can also be separated by a narrow, strip-shaped, flat surface or a transitional rounding with a corresponding radius which extends between the parallel sides of the triangular surfaces and parallel to the intermediate plane.

As already mentioned the peripherally extending side surface of the indexable insert substantially comprises four surface portions, wherein each of the surface portions has along a main cutting edge a border portion, that is to say a clearance surface which extends only over a part of the surface portion that is near the cutting edge, and which includes an even smaller wedge angle with the top side and the underside respectively than the remaining part of the surface portion.

Moreover the surface portions like the triangular surfaces of the top side and the underside are respectively surfaces which are not parallel to each other and which can be flat and which partially and in particular in the region of the border portion strip of a clearance surface along a cutting edge can however also be of a slightly spherical configuration.

The corner regions of the rhombic basic shape and also of the top side and the underside can each be flattened or rounded, wherein the top side and the underside respectively have two cutting edges of which a first extends between an obtuse-angled and an acute-angled corner of the indexable insert and the second main cutting edge extends between the corners which are in diagonally opposite relationship thereto. It will be appreciated that such rounded or flattened configurations at the corners of the indexable insert form along the side surface further smaller surface portions which however do not play an essential role in terms of the basic geometry, as was described above.

If, based on the rhombic basic shape, displacement of diagonally opposite corners and also of corners associated with the same rhombus corner of the top side and the underside is effected in paired relationship respectively in opposite directions and by the same amount, that accordingly results in an indexable insert which is point-symmetrical.

In addition the indexable insert according to the invention is symmetrical in respect of rotations through 180° respectively about both diagonals of the rhombus of the notional intermediate plane and also in relation to a central axis through the rhombus perpendicularly to the intermediate plane. The indexable insert according to the invention however does not involve any mirror symmetry at all in relation to any plane and also no symmetry in relation to any rotation which is not an integral multiple of 180°. The total of the foregoing symmetry conditions is an alternative option for characterising the indexable insert according to the invention.

In regard to a shoulder milling cutter the object of the invention is attained in that the shoulder milling cutter has a plurality of mounting cutouts for indexable inserts which respectively have at least 3 seat surfaces of which a first seat surface provides a support for an indexable insert predominantly in a radial direction, a second seat surface provides a support predominantly in an axial direction and a third seat surface provides a support for the indexable insert predominantly in the tangential direction, wherein the third seat surface comprises at least two mutually angled surface portions of which one includes a positive axial angle with the axis of the shoulder milling cutter and the other includes a negative axial angle.

The terms 'positive' and 'negative' are here randomly selected and are only intended to express the fact that the one surface is inclined with respect to the axis in a first direction and the other surface is inclined with respect to the axis in the opposite direction.

The shoulder milling cutter preferably has at least one or any combination of a plurality of the features listed hereinafter:

With respect to a plane perpendicularly to the axis the said surface portions of the third seat surface respectively include opposite angles with that radial plane.

The surface portions of the third seat surface are approximately triangular and in a tangential plan view on to the milling cutter jointly define a parallelogram shape with an approximately rhombic basic shape, insofar as two of the sides of the triangular surface portions extend parallel.

The triangular surface portions of the seat include an angle of between about 110° and 165°, preferably between 135 and 155°, on the side remote from the indexable insert, with each other.

The parallel sides of the two triangular surfaces extend approximately in a plane containing the milling cutter axis and are inclined at an angle of between 30° and 60° relative to the milling cutter axis.

In addition the triangular surfaces of the third seat surface, in the preferred embodiment of the invention, are separated by a narrow elongate planar surface which also forms a part of the third seat surface and which is oriented approximately in axis-parallel relationship and the long sides of which coincide with the parallel sides of the triangular surfaces.

A fixing bore is provided between the triangular surfaces in the region of the parallel triangle sides or the planar surface, wherein the axis of the bore extends approximately parallel to the tangential direction (with respect to the milling cutter) into the third seat surface.

Finally a preferred embodiment of the shoulder milling cutter is provided with a plurality of indexable inserts according to one of claims 1 to 17.

Figure 2:
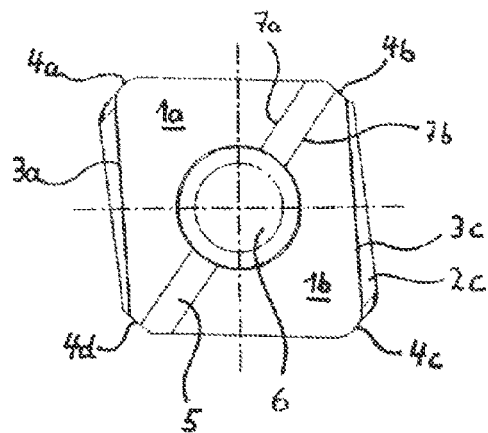
Figure 3:
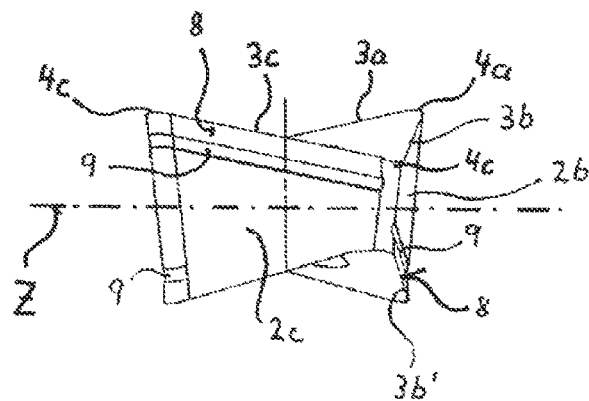
Figure 4:
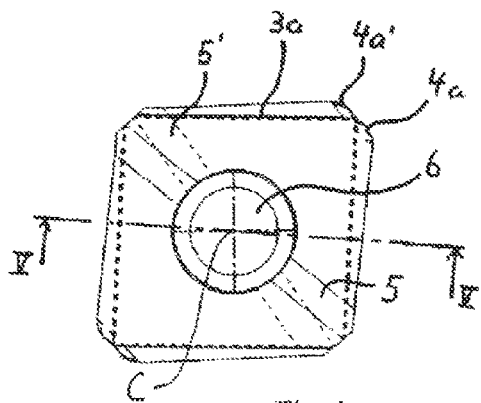
Figure 5:
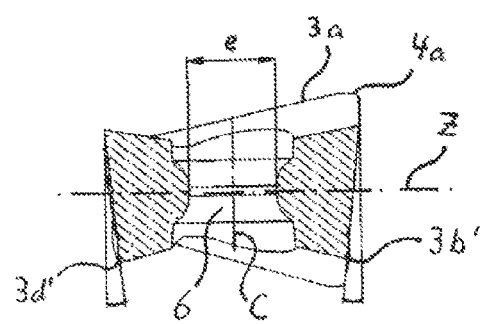

Further advantages, features and possible uses of the present invention will be apparent from the description hereinafter of preferred embodiments and the accompanying Figures in which:

FIG. 1 diagrammatically shows the geometrical basic structure of an indexable insert according to the invention as a plan view on to the top side or the underside, FIG. 2 shows an embodiment of an indexable insert according to the invention in a plan view from above or below, FIG. 3 shows a side view of the indexable insert of FIG. 2, FIG. 4 shows a superimposition of top side and underside of an indexable insert according to the invention in a position of being turned through 90° relative to FIG. 1, FIG. 5 shows a section through the indexable insert of FIG. 4 corresponding to section line V-V, FIG. 6 shows a perspective view of a shoulder milling cutter equipped with indexable inserts as shown in FIG. 2, FIGS. 6a-6c show various views of a shoulder milling cutter equipped with indexable inserts as shown in FIG. 2, FIG. 7 shows a perspective view of a shoulder milling cutter according to the invention without indexable inserts, and FIG. 8 shows a detail from FIG. 7.

FIG. 1 diagrammatically shows the basic shape of an indexable insert according to the invention as a transparent view, specifically as a plan view on to the top side (which is identical to a plan view on to the underside). All visible edges of the geometrical basic shape are reproduced by solid lines while the lines which are concealed but which are rendered visible here by virtue of the transparent view are shown as dash-dotted lines. Finally a broken line shows the contours of a rhombus $R_Z$ which is inscribed into the indexable insert and which defines an intermediate plane Z which here can be imagined as being coincident with the plane of the paper.

The rhombus is spanned by its corners $z_a$ to $z_d$ or by four equal-length sides $z_1$, $z_2$, $z_3$ and $z_4$ which extend along the side surfaces $2a$, $1b$, $1c$ and $1d$ of the indexable insert and which lie in a common plane which here is referred to as the intermediate plane Z.

The top side 1 of this basic geometry of the indexable insert is formed by two triangular surfaces $1a$ and $1b$ which are spanned by the corners $4a$, $4b$ and $4d$, and $4c$, $4b$ and $4d$ respectively. Those triangular surfaces of the top side 1 including the edges $3a$, $3b$, $3c$, $3d$ delimiting them lie above the plane of the paper. The junction (not shown) of the corners $4b$ and $4d$ forms a common side of the triangular surfaces $1a$ and $1b$.

The underside is similarly spanned by two identical triangular surfaces delimited by the corners $4a'$, $4b'$ and $4d'$, and by $4c'$, $4b'$ and $4d'$ respectively. The underside and the delimiting edges $3a'$, $3b'$, $3c'$ and $3d'$ are disposed below the plane of the paper.

Starting from a body which is rhombic in plan view and in which the corners ($4a$, $b$, $c$, $d$ and $4a'$, $b'$, $c'$, $d'$) of the top side and the underside in plan view are respectively brought into alignment with the corners of the rhombus $R_Z$ so that all corners and edges of the top side and the underside fall in the plan view on to the corners and broken lines of the intermediate plane, production of the specific geometrical shape can be imagined for example in such a way that the body is twisted helically both about the diagonal $d_1$ and also about the diagonal $d_2$ of the rhombus z, as indicated by arrows at the ends of the diagonals $d_1$ and $d_2$. In other words, the edge joining the corners $4a$ of the top side and $4a'$ of the underside is turned about the axis or diagonal $d_1$ in a first direction and the diagonally opposite edge joining the corner $4c$ of the top side and the corner $4c'$ of the underside is turned about the axis $d_1$ in the opposite direction. Similarly the body is also twisted about the axis $d_2$, more specifically so that the direction of rotation of the helical twisting is opposite to the direction of rotation in relation to the axis $d_1$. In other words the corner 4a, starting from the associated corner of the rhombus z, is displaced towards the right, and the corner 4c is displaced by the same amount from the corner of the rhombus or the diagonal $d_1$ towards the left, while the displacements on the underside are precisely in the opposite direction. The specific indexable insert shown in the following Figures differs from that geometrical basic shape only in respect of minor modifications, namely by rounding of the edges joining the corners 4a, 4a' and 4c, 4c' and by flattening or beveling of the edge joining the corners 4b, 4b' and 4d, 4d' and by virtue of the fact that in addition the two triangular surfaces 1a, 1b of the top side and the corresponding surfaces of the underside are also separated from each other by a narrow flat strip 5, 5' disposed in a plane parallel to the intermediate plane Z of the rhombus $R_Z$.

A plan view of such an actual indexable insert is shown in FIG. 2.

In FIG. 2 only the corners, edges and surfaces of the top side are provided with references.

As will be seen the corners 4a and 4c are rounded and the corners 4b and 4d are flattened. In addition extending transversely over the top side there is also a narrow strip-shaped flat surface 5 which is parallel to the above-mentioned intermediate plane Z but which is also angled somewhat in relation to a line centrally joining the flattened corners. The parallel sides 7a, 7b of the triangular surfaces 1a, 1b, which moreover are also interrupted by a central bore 6, form the two edges of the flat surface 5. Accordingly, adjoining that strip-shaped flat surface 5 are the two triangular surfaces 1a, 1b which, as already mentioned, are angled out of the plane of the paper and relative to each other through an angle of about 40°, that is to say they include approximately an angle of 140° therebetween, as can also be seen from FIG. 3.

At the centre of the indexable insert the surfaces 1a, 1b and 5 are interrupted by a central fixing bore 6 whose axis C extends perpendicularly to the notional intermediate plane Z, wherein the plane Z is in turn defined by the pairs of cutting corners 4a, 4a' and 4c, 4c' respectively being at the same spacing relative to the intermediate plane and the corners 4b and 4b' as well as 4d and 4d' being at a spacing (which is smaller in specific terms) relative to the intermediate plane Z, which spacings are equal to each other but different in relation to the spacing of the corner 4a.

As can already be seen on the basis of the fundamental structure of the geometry of the indexable insert shown in FIG. 1 two respective opposite edges which connect the corners 4a, 4d and 4c, 4b respectively together are relatively long edges (3a and 3c respectively) while the other edges of the top side, namely those which connect the corners 4a and 4b, and 4c and 4d respectively, are shorter. Conversely at the underside the edges 3a' and 3c' opposite to the long edges 3a, 3c are short edges while the edges 3b' and 3d' arranged therebetween are long edges and thus form main cutting edges.

That also applies to the specific indexable insert shown in FIGS. 2 to 5, even if the rounded configurations and bevels of the corners additionally also somewhat shorten the remaining edges. The angle between the main and the secondary cutting edges, which blend into each other by way of a rounded cutting corner 4a, 4c and 4a', 4c' respectively, is about 82° in the plan view in the illustrated embodiment. The radius of the cutting corner is between 1 and 2 mm. The flattened corners 4b, b' and 4d, d' are not provided for engagement with a workpiece. The flattened corners provide that the surfaces 1a and 1b are not exactly triangular but have a cut-off corner. Nonetheless the surfaces 1a and 1b remain substantially triangular and are here still identified as triangular surfaces, even with such small deviations.

FIG. 3 shows a side view of the indexable insert corresponding to a view in a direction on to the indexable insert of FIG. 2 from the right.

As will be seen the side surfaces 2a, 2b, 2c and 2d in respectively adjoining relationship with a cutting edge have a clearance surface 8 which is slightly angled relative to the remaining part of the respective side surface and which is additionally also set off from the other part of the surface portion 2a, b, c, d by a flat rounded groove 9. Due to the greater inclination of the clearance surface 8 relative to the other part of the side surface the positive wedge angle (wedge angle <90°) is still increased somewhat than it would in any case already be without that angled configuration.

FIG. 4 again shows a plan view on to the top side of the indexable insert in a position of being turned through 90° relative to FIG. 2, in which case also the indexable insert is again shown as being transparent and the edges which are concealed in themselves are shown in broken line. It will be seen from this view that the longitudinal direction of the flat surface 5 is additionally inclined somewhat in relation to a diagonal between the corresponding corners in the longitudinal orientation thereof. The two surfaces 5, 5' however extend parallel to the intermediate plane Z which is shown in FIG. 3 by a horizontal dash-dotted line and which corresponds in FIGS. 2 and 4 to the plane of the paper.

Finally FIG. 5 also shows a section through the indexable insert according to the invention along line A-A in FIG. 4. In this case also the position of the intermediate plane Z is shown by a dash-dotted line. In the region of the cutting corners (measured perpendicularly to the intermediate plane) the thickness of the indexable insert is between about 6 and 12 mm and the thickness in the region of the flattened corners is about 40 to 70% of the thickness in the region of the cutting corners 4a, 4a', 4c, 4c'.

As will be seen a central bore 6 extends perpendicularly to the intermediate plane Z and from the top side of the indexable insert to the underside thereof. The bore 6 is symmetrical in relation to a rotation through 180° about one of the diagonals d1 and d2, as were defined in relation to FIG. 1.

FIG. 6 shows a perspective view of a milling cutter equipped with corresponding indexable inserts and FIGS. 6a to c show the same milling cutter as an end plan view and two side views displaced through 90° relative to each other.

In accordance with the arrangement of the indexable inserts 10 on this milling cutter this involves a shoulder milling cutter 20 which has five seats and indexable inserts 10 correspondingly arranged therein. In this case the indexable inserts are so oriented that a respective one of the main cutting edges 3a, 3c and 3b' or 3d' respectively is arranged approximately in axis-parallel relationship at the periphery of the shoulder milling cutter and secondary cutting edges (3b, 3d, 3a' and 3c') respectively adjoining the cutting corners 4a, 4c and 4a' and 4c' respectively extend inclinedly at a slight clearance angle with respect to a plane E perpendicular to the axis of rotation 15.

It will be seen in particular from the end view in FIG. 6a that this arrangement involves a positive cutting geometry for the main cutting edges with a positive rake angle y as the rake surface respectively follows behind the main cutting edge in the direction of rotation.

FIG. 7 once again shows a corresponding milling cutter but without indexable inserts, as a perspective view, while FIG. 8 shows a portion from FIG. 7 on an enlarged scale.

As will be seen a seat 28 for a corresponding indexable insert has a radial contact and support surface 21, an axial contact surface 22, and three seat surfaces 23, 24 and 25 which predominantly support in the peripheral direction, wherein in each case at least one of the surfaces 23 and 24 serves as a support surface for at least a respective one of the triangular surface portions 1*a*, 1*b* (or 1'*a*, 1'*b*). The surfaces 21 and 22 respectively come into contact with the side surfaces 2*c* and 2*d* when the active main cutting edge is the edge 3*a*.

At the transition between the contact surfaces 21 and 22 and towards the surface 23 it is possible to see respective relief grooves 26, 27 which contact-lessly receive the edges of an indexable insert 10. A threaded bore 16 is arranged centrally in the surface 25 and also involves the surfaces 23 and 24.

As can be seen from FIGS. 6 to 8 a corresponding seat 28 of a shoulder milling cutter 20 affords large, mutually angled contact surfaces for the complementary surfaces of the indexable insert 10 and in particular the surface 24 opposite the main cutting edges supports the indexable insert and its respectively active cutting edge securely and over a large area.

The indexable insert according to the invention has four equivalent cutting edges to be oriented as main cutting edges and disposed in mutually opposite paired relationship on the same side (top side and underside respectively) so that the cutting edges do not have any jointly used corners so that a main cutting edge is respectively unused after turning or indexing, including the corners thereof. In that respect the main cutting edges of the top side are opposite the secondary cutting edges of the underside and vice-versa. In other words, each of the surface portions 2*a*, 2*b*, 2*c* and 2*d* either forms a main cutting edge with the top side or with the underside and a secondary cutting edge with the respective other side. At the same time main and secondary cutting edges are respectively of a positive cutting geometry and are supported on the opposite side securely and over a large area. Non-active cutting edges are respectively received in well-protected fashion in the seat of the miffing cutter.

The indexable insert according to the invention is thus particularly well suited to high-output shoulder milling cutters.

The invention claimed is:

1. An indexable insert having a top side and an underside which are connected together by a peripherally extending side surface comprising a plurality of surface portions,
   wherein at least some intersection lines between the surface portions and the top side and the underside respectively form equivalent cutting edges,
   wherein the indexable insert in a plan view on to the top side and the underside is respectively in the shape of a non-rectangular parallelogram with an almost rhombic basic shape and has a notional intermediate plane which is spanned by four corners of a notional rhombus, whose sides extend at a spacing relative to the top side and the underside along the peripherally extending side surface in a plane in such a way that each of the equivalent cutting edges of the top side and the underside has the same variation in spacing and angle relative to the intermediate plane,
   wherein two mutually diagonally opposite corners of the top side and two diagonally opposite corners of the underside are respectively at a greater spacing from the intermediate plane than the respectively interposed mutually diagonally opposite corners of the top side and the underside,
   wherein the mutually diagonally opposite corners of the top side as well as the mutually diagonally opposite corners of the underside are displaced in parallel relationship with the intermediate plane and in the plan view on to the intermediate plane respectively in mutually opposite directions away from an associated diagonal of the rhombus spanning the intermediate plane,
   wherein the rhombus which defines the intermediate plane and which is spanned by sides extending along the peripherally extending side surface is non-rectangular,
   wherein the top side and the underside are respectively formed by two substantially triangular surfaces of which a tip respectively coincides with acute-angled corner of the parallelogram-shaped top side and underside respectively,
   wherein the sides of the triangular surfaces, that are opposite said tip, extend parallel and extend approximately between obtuse-angled corners of the parallelogram shape,
   wherein said triangular surfaces forming the topside are oriented relative to each other at an angle of between about 110° and 165° and said triangular surfaces forming the underside are oriented relative to each other at an angle of between about 110° and 165°, and
   wherein, in the plan view on to the top side and the underside, respectively, two diagonally opposite corners are displaced in the clockwise direction with respect to the associated diagonal of the rhombus and the corners therebetween are displaced in the anti-clockwise direction with respect to the associated diagonal, whereby the rhombic basic shape of the top side and the rhombic basic shape of the underside are shifted relative to each other and each have a parallelogram shape with sides having different lengths.

2. An indexable insert according to claim 1, wherein the corners of the top side and the underside, that are arranged in relation to the same corner of the rhombus of the intermediate plane, are displaced in opposite directions with respect to the associated diagonal.

3. An indexable insert according to claim 1, wherein the cutting edges are respectively provided along long sides of the parallelogram shape.

4. An indexable insert according to claim 1, wherein cutting corners of the indexable insert are at a greater spacing from the intermediate plane at the acute-angled corners of the parallelogram as compared to the obtuse-angled corners of the parallelogram.

5. An indexable insert according to claim 1, wherein the thickness of the insert as measured perpendicularly to the intermediate plane between the top side and the underside in the region of the obtuse-angled corners is between 40 and 70% the thickness at the acute-angled corners.

6. An indexable insert according to claim 1, wherein extending on the top side and on the underside is a respective narrow planar surface oriented parallel to the intermediate plane between the parallel sides of the triangular surfaces.

7. An indexable insert according to claim 1, wherein the side surface substantially comprises four surface portions and that each of the surface portions along a cutting edge has a relief surface which extends only over a portion, near the cutting edge, of the surface portion, the relief surface including a smaller wedge angle with the top side and the underside respectively than the remaining portion of the surface portion.

8. An indexable insert according to claim 1, wherein the triangular surfaces of the top side and the underside as well as the surface portions of the side surfaces, that define cutting edges, as well as relief surfaces are all non-parallel surfaces.

9. An indexable insert according to claim 1, wherein the acute-angled corners and/or the obtuse-angled corners of the indexable insert are flattened or rounded, and the top side and the underside each have two cutting edges of which a first extends between one of the obtuse-angled corners and one of the acute-angled corners and the second extends between the corners disposed in diagonally opposite relationship therewith.

10. An indexable insert according to claim 1, wherein the indexable insert is point-symmetrical.

11. An indexable insert according to claim 1, wherein it is symmetrical in relation to 180° rotations about both diagonals of the rhombus of the intermediate plane and about a central axis through the rhombus perpendicularly to the intermediate plane.

12. An indexable insert according to claim 1, wherein the indexable insert has no mirror symmetry in relation to any plane and no symmetry in relation to any rotation which is not an integer multiple of 180°.

13. An indexable insert according to claim 1, wherein the rhombus has an angle of between 60° and 88° at its acute-angled corners.

14. An indexable insert according to claim 5, wherein the thickness of the insert as measured perpendicularly to the intermediate plane between the top side and the underside in the region of the obtuse-angled corners is approximately half the thickness at the acute-angled corners.

15. An indexable insert according to claim 1, wherein said triangular surfaces are oriented relative to each other at an angle of between 135° and 155°.

16. An indexable insert according to claim 4, wherein the thickness of the insert as measured perpendicularly to the intermediate plane between the top side and the underside in the region of the obtuse-angled corners is approximately half the thickness at the acute-angled corners.

17. A shoulder milling cutter including:
a plurality of mounting cutouts for indexable inserts which respectively have at least three seat surfaces of which a first seat surface provides a support predominantly in a radial direction, a second seat surface provides a support predominantly in an axial direction and a third seat surface provides a support predominantly in the tangential direction, wherein the third seat surface comprises at least two mutually angled surface portions of which one includes a positive axial angle with the axis of the shoulder milling cutter and the other includes a negative axial angle, and
a plurality of indexable inserts according to claim 1 positioned in the mounting cutouts.

* * * * *